(12) United States Patent
Osann, Jr.

(10) Patent No.: US 10,585,959 B2
(45) Date of Patent: *Mar. 10, 2020

(54) INTERNET SEARCH RESULTS ANNOTATION AND FILTERING FOR MISSING SEARCH TERMS

(71) Applicant: Robert Osann, Jr., Port Angeles, WA (US)

(72) Inventor: Robert Osann, Jr., Port Angeles, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,900

(22) Filed: Aug. 28, 2019

(65) Prior Publication Data

US 2019/0392010 A1 Dec. 26, 2019

Related U.S. Application Data

(63) Continuation of application No. 16/199,192, filed on Nov. 25, 2018, now Pat. No. 10,437,900, which is a
(Continued)

(51) Int. Cl.
| | |
|---|---|
| *G06F 7/00* | (2006.01) |
| *G06F 17/30* | (2006.01) |
| *G06F 16/9535* | (2019.01) |
| *G06F 16/957* | (2019.01) |
| *G06F 16/248* | (2019.01) |
| *G06F 16/338* | (2019.01) |
| *G06F 16/9038* | (2019.01) |

(52) U.S. Cl.
CPC ........ *G06F 16/9535* (2019.01); *G06F 16/248* (2019.01); *G06F 16/338* (2019.01); *G06F 16/9038* (2019.01); *G06F 16/9577* (2019.01)

(58) Field of Classification Search
CPC ............ G06F 16/9535; G06F 16/9577; G06F 16/338; G06F 16/248; G06F 16/9038; G06F 17/3053; G06F 17/30554; G06F 17/30882; G06Q 10/00; G06Q 10/10; G06Q 30/02; G06Q 50/01
See application file for complete search history.

(56) References Cited

U.S. PATENT DOCUMENTS

2008/0091834 A1* 4/2008 Norton ................... G06Q 10/00
709/229
2016/0012050 A1* 1/2016 Bursey .................. H04L 67/306
707/732

* cited by examiner

*Primary Examiner* — Azam M Cheema

(57) ABSTRACT

Internet searches sometimes provide search results referencing webpages that do not contain all search term elements submitted by a user. The user may then click on such Internet search results where referenced webpages, and/or their descendants, do not contain important search term elements. Also, advertisements may be placed on search results webpages that relate to the user's search term elements, even though there may be search terms missing in referenced and/or descendant webpages. The present invention is directed to: annotating Internet search results to indicate missing search term elements on referenced and descendant webpages; optionally filtering out search results referencing webpages with missing terms; and showing advertisements related to search term elements. This annotation and/or filtering facilitates the user to avoid clicking on an Internet search result where the user's search term elements are not present on referenced and/or descendant webpages, thereby preventing wasted time and speeding the search process.

25 Claims, 11 Drawing Sheets

Related U.S. Application Data continuation of application No. 15/383,907, filed on Dec. 19, 2016, now Pat. No. 10,140,374, which is a continuation of application No. 14/820,433, filed on Aug. 6, 2015, now Pat. No. 9,529,920, which is a continuation of application No. 13/163,614, filed on Jun. 17, 2011, now Pat. No. 9,104,765.

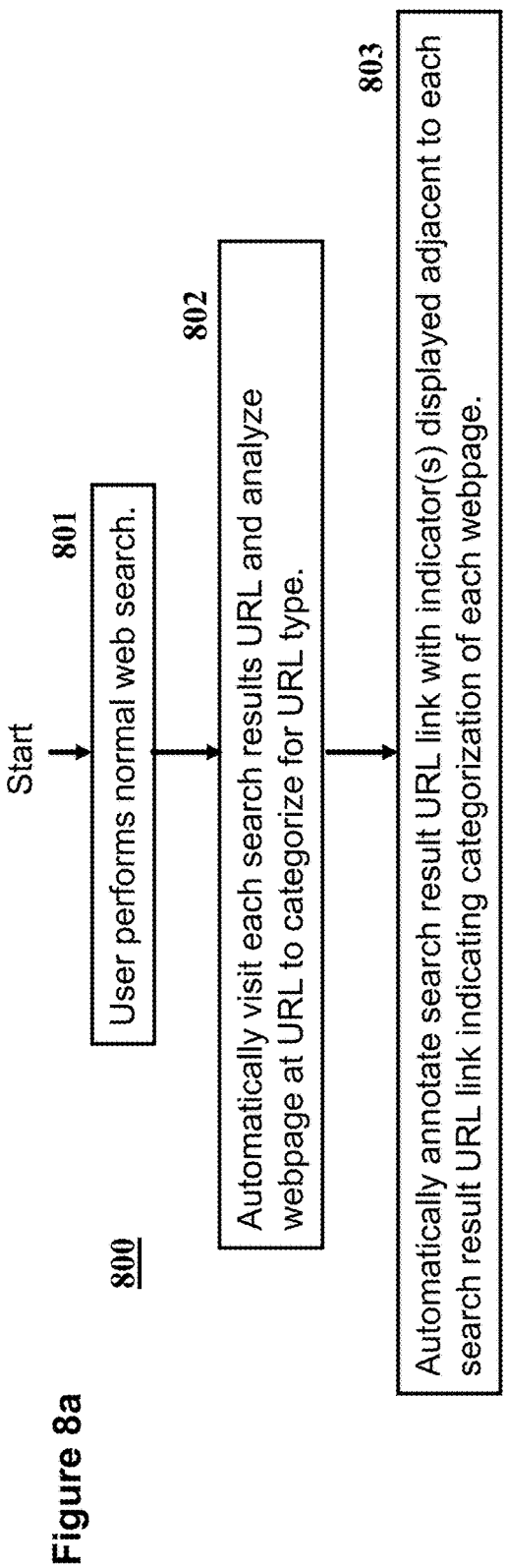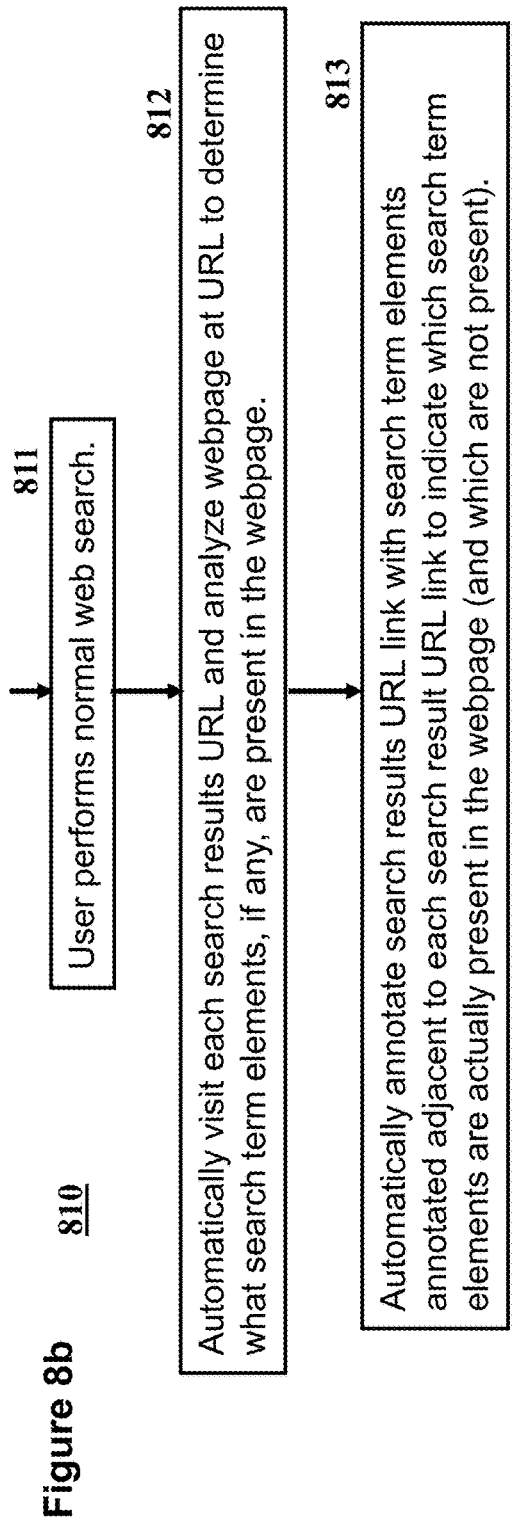
Figure 8a
Figure 8b
Figure 8

Filter Characteristic Selection

| Select | Abbrev | Description |
|---|---|---|
| ☐ | N | Null Page – No search term elements appear |
| ☐ | NP | Null Partial – Some but not all elements appear |
| ☒ | ND | Null Descendant – Missing terms appear on descendant pages |
| ☒ | DC | Descendant Completes – Including descendant pages, all terms appear |
| ☐ | C | price Comparison webpage |
| ☒ | S | Search webpage |
| ☐ | SL | Sponsored Links included on webpage |
| ☒ | I | Information webpage |
| ☐ | Bl | Blog webpage |
| ☒ | Fo | Forum webpage – theme focused |
| ☐ | N | News webpage |
| ☒ | SN | Social Networking webpage |
| ☐ | R | Retailer/Distributor webpage |
| ☒ | G | Gallery webpage |

Figure 11

INTERNET SEARCH RESULTS ANNOTATION AND FILTERING FOR MISSING SEARCH TERMS

CROSS-REFERENCE TO RELATED APPLICATIONS

This application is a Continuation of U.S. Utility patent application Ser. No. 16/199,192 filed on Nov. 25, 2018 entitled "Internet Search Results Annotation for Missing Search Terms in Descendant Webpages", which is a Continuation of U.S. Utility patent application Ser. No. 15/383,907 filed on Dec. 19, 2016 entitled "Automatic Webpage Characterization and Search Results Filtering", which is a Continuation of U.S. Utility patent application Ser. No. 14/820,433 filed on Aug. 6, 2015 entitled "Automatic Webpage Characterization and Search Results Annotation", which is a Continuation of U.S. Utility patent application Ser. No. 13/163,614 filed on Jun. 17, 2011 entitled "Automatic Webpage Characterization and Search Results Annotation".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to systems and methods for Internet search and related advertising functions.

BACKGROUND

At the time of the present invention, it is frequent that a user of Web browsers and search engines clicks on a link in the search engine results only to find themselves on a website that offers none of the information they were searching for. Instead they often find webpages that simply waste their time. Many such webpages provide mostly links to other sites and frequently offer an overwhelming number of advertising links. Such websites that primarily offer links to other Websites may thus be referred to as "linking sites". Other categories of website/webpage are found in search results that are irrelevant or of little inherent use with regard to what the user seeks and also effectively waste the user's time.

Many more domain names are purchased than there are active websites performing specific functions particular to a user or business. When a domain name purchaser "parks" a domain at a hosting company, that domain may show up as an "under construction" message, however frequently the user who makes the decision to park the domain opts for making it a "linking site" which has some financial advantage to them. Some registrant/hosting companies automatically make a parked domain into a linking site without compensating the owner at all. Also, there exist businesses that own a very large number of domains and place linking site functionality at those URLs. Some of these choose domain names that are misspellings of popular business names. Regardless of why and how such linking sites are placed on the Internet, it is very frequent today that someone performing web searches finds themselves looking at such a site when they hoped to be viewing the site belonging to a real business. This again wastes time and frustrates the user. A way to warn the user that they are about to navigate to such a site would be useful to many persons. Some may even want a way to exclude such a site from being referred to in their search results.

While search engine providers today claim to focus on providing "relevant" results, the reality seems to be that their primary mission is to make money—typically through advertising and linking-based referral services.

A user may find that a webpage located at a URL link provided on a search results page not only contains irrelevant information given their intended search, it also doesn't contain the search terms that they had specified. The basic format for specifying a search with any search engine includes an implied AND-function of the specified search term elements. As such, one would expect that each webpage corresponding to a search result URL link contains all the specified search term elements. Unfortunately today, it is frequent that many of the search term elements will be missing from the results webpage and in some cases all will be missing. Sometimes a subset of search term elements will be contained in a webpage located at a search result URL link while other specified search term elements are located in descendent webpages of the webpage located at the search result URL link. Thus, the descendent webpage may still at times be useful to the user. There is a reason a user specifies the initial set of search term elements. They expect results where each listed webpage contains all the elements. Knowing in advance which webpages contain which search term elements would be useful to aid the user in minimizing lost time and frustration.

FIG. 1 shows a typical search engine browser window 101 running on a personal computing device, in this case a laptop or notebook computer 100. In response to search term elements entered in the primary search term input bar 102, the search engine returns for example, results information groups 103 and 104, each group containing the title of a search result webpage, some form of excerpt from the webpage, and the URL link at which the webpage is located. To the left of this grouping sometimes appear specific links 105 related to the search engine itself, such as links to specific search engine tools, for example specific searches for images, videos, news, shopping, books, places, blogs, discussions, recipes, patents, and more. At the right of results information groups 103 and 104, it is common that groups of advertising information such as titles, links, and summaries appear, shown here as advertising information groups 106 and 107.

It would be advantageous if additional information appeared on a browser search results webpage such as that shown in FIG. 1 where this additional information provides insight to the user on what is contained in the webpage located at each search result URL such as URLs 108 and 109. This foreknowledge of the contents of these webpages could prevent the user from wasting their time reviewing pages that are not relevant to their search. It would also be advantageous if the user could optionally cause results webpage links that fall into undesirable or relevant categories (from their perspective and/or relative to their current search) to be deleted from their search results in order to focus their search more completely on irrelevant webpages. Such enhancements to the search process save users valuable time and avoid frustration—making the user experience more positive from both an emotional and productivity standpoint—especially for those users who perform web browsing and searching for a substantial part of their everyday job.

SUMMARY

The present invention offers users the opportunity to annotate and/or filter their search results to delineate and/or remove references to sites that offer unwanted or irrelevant categories of information and as a result provide the user with a set of search results that offer and/or emphasize information of substance on their search topic. Some users may choose to not eliminate potentially irrelevant search results and have the search engine results prominently flagged or annotated according to the instant invention to mark webpages according to categories of information which may for instance include webpages that consist primarily of links to other sites and/or do not provide relevant business or product oriented information. While such annotation or filtering functions may be performed by the company providing the search engine itself, performing such functions may be counter to the business interests of the search engine provider. Alternately, a plug-in or software program running on the user's computer or on a compute server on the Internet, may analyze and scrutinize the search results being shown to the user and flag/annotate search results so the user will know in advance which links to avoid. A plug-in or software program on the user's computer can analyze webpages located at URL links in the search results webpage to determine which sites comprise an unwanted site by automatically visiting each site in the list and running a quick analysis of the landing webpage. Given the available speed of broadband connections today as well as the ever increasing speed of processors in personal computers this capability is definitely viable. Even if it takes longer to scrutinize the websites located at the URLs in a typical search results list of 10 hyperlinks, the automatic scrutinizing and marking can be done starting with the links at the top of the page and successively marking search results going down the page as the analysis of each referenced URL is completed. Since a user's viewing process typically starts at the top of the search results list followed by working their way down the page, this methodology of flagging or annotating search results URL links is compatible with the typical user's manner of scrutinizing and interpreting search results.

Analysis of webpages located at search results URL links (and descendant pages of those pages) may be viewed for example as falling into two major categories—a categorization of the information provided by the webpage, and the presence of search term elements on the webpage.

To provide increased performance for a webpage characterization analysis according to the present invention, a compute server or servers may be located on the Internet, including location on one or more compute servers in the "Cloud". This increased performance may be advantageous for webpage analyses that include descendant webpages of a webpage located at a search result URL link.

When analyses of webpages are performed according to the present invention it is possible to accumulate a database of categorization results of analyzed webpages. This may be useful and is considered an optional functionality of the present invention. However, webpages frequently change and the most accurate categorization will always be that performed at the time of the user's search.

Once a webpage has been analyzed according to the present invention, the search result grouping on search results webpage wherein the URL link to a specific webpage is located may be annotated to indicate its categorization as well as the presence of search term elements. Alternately, a search results grouping may be deleted from a search results webpage according to a characterization of the webpage referred to by the search result grouping by way of a filtering functionality based on a set of criteria specified by the user.

BRIEF DESCRIPTION OF THE DRAWINGS

FIG. 8a shows an exemplary process for analysis, categorization, and annotation of webpages located at search result URL links.

FIG. 8b shows an exemplary process for analysis and annotation to indicate which search term elements are actually present in a webpage located at a search result URL link.

FIG. 11 shows one exemplary and non-limiting embodiment of a dialog box where a user enters filter selection criteria that determines which search result groupings would be displayed or not displayed on a search results webpage.

DETAILED DESCRIPTION OF THE INVENTION

Figure 1:
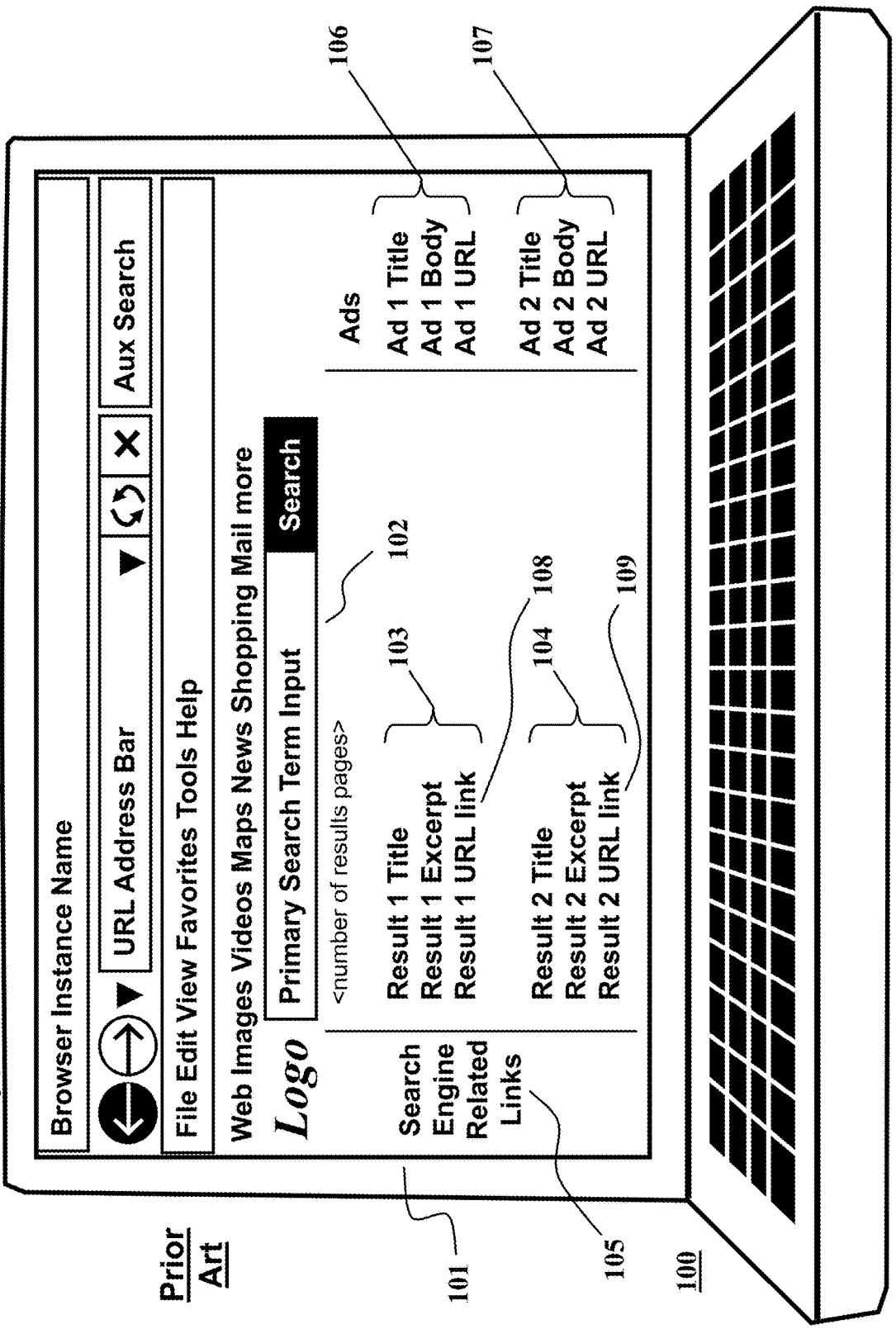
FIG. 1 shows a typical prior art search engine results webpage displayed in a browser window on a typical PC, in this case a laptop computer.
Figure 2:
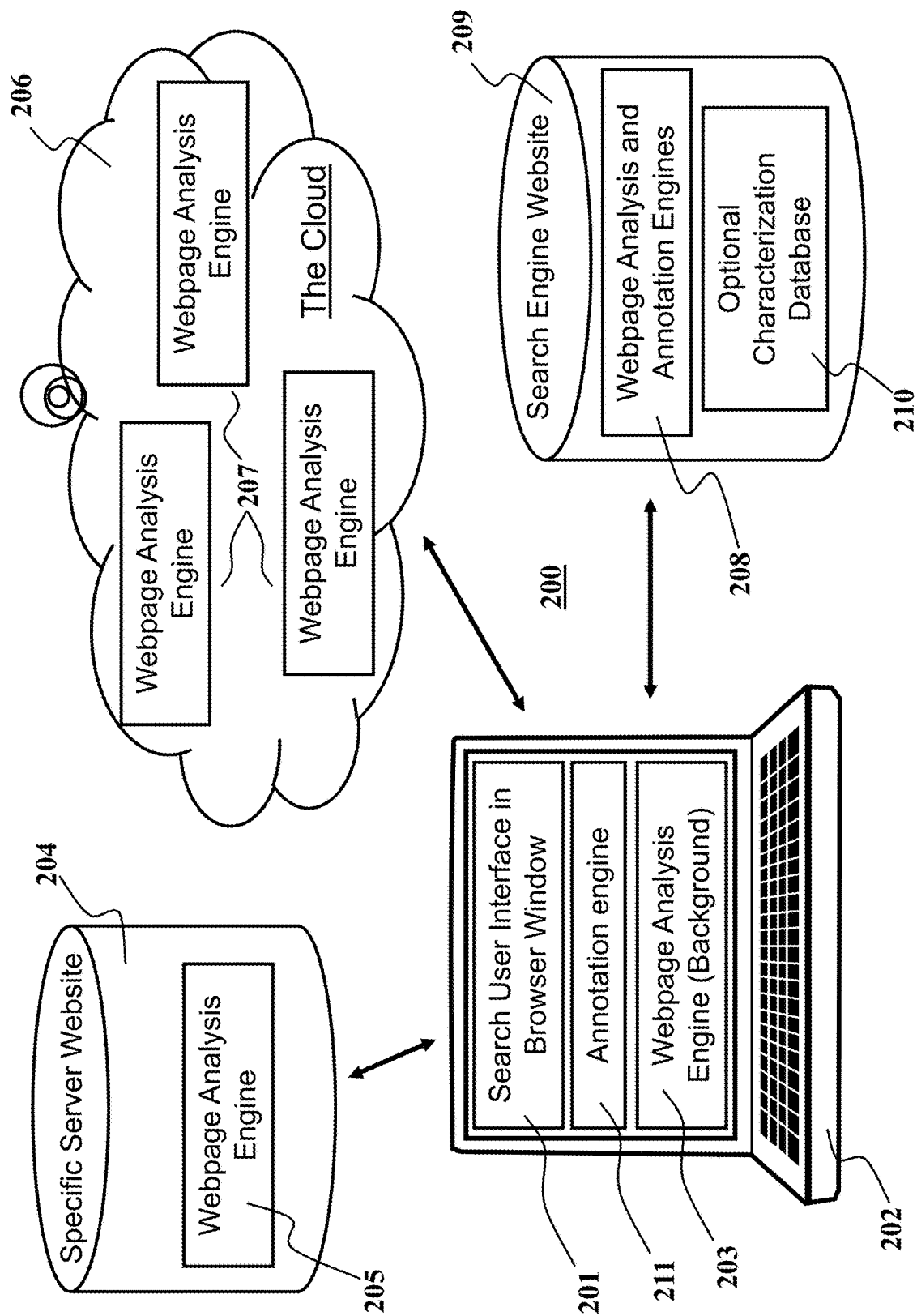
FIG. 2 shows an overview of possible system architectures according to the present invention.

FIG. 2 shows an overview of possible and exemplary architectural implementations for a system 200 according to the present invention with emphasis on where different software functionalities may reside and operate. The user interface for a search engine appears to the user in a browser window 201 running on a PC 202. PC 202 may be any form of personal computing device including for example a desktop, laptop, notebook computer, smart phone, tablet computer, etc. According to the present invention webpages located at search results URL links are analyzed to determine their specific characteristics. This analysis is performed by an analysis engine which may occur on the user's PC as analysis engine 203. The analysis engine may also operate on a specific server website 204 as analysis engine 205. Alternately the analysis engine may operate on one or more compute servers located in "the Cloud" 206 and occur as one or more of analysis engine instances 207. Yet another implementation has the webpage analysis engine co-resident with a webpage annotation engine as element 208 operating on a search engine website 209 in the circumstance where analysis annotation and/or filtering according to the present invention are performed by the search engine provider themselves. For configurations where the webpage analysis engine is located on the user's computing device 202, a server specific website 204, or in the cloud 206, the annotation engine 211 will typically reside on the user's computing device 202. These examples are exemplary and non-limiting, and it is possible to construct a system where analysis, annotation, and filtering engines reside on any of the various computer locations shown in FIG. 2.

Also shown here on the search engine provider's website 209 is an optional characterization database 210. Search engines keep records of webpages they supply links to as part of search results, and when search engine robots visit such webpages, besides recording the information from the page, functionality belonging to the search engine provider could characterize the webpage according to the different characterization functionalities of the present invention and record those characterizations in a characterization database. Then that information would be instantly available when search results are supplied to the user and could be utilized in annotating and/or filtering search results should a search engine provider wish to perform such a functionality according to the present invention. It is also possible for any of the webpage analysis engines shown in FIG. 2 to create and update a characterization database as the analysis engine operates regardless of whether that engine operates on PC 202, specific server website 204, or one or more compute servers located in the Cloud 206. According to the present invention the preferred implementation for analysis of a webpage located at a search results URL has that analysis occurring at the time of a user's search request, since only then will the characterization of the webpage truly represent what is contained on that webpage at that moment in time. Should an analysis and characterization be performed at an earlier point in time with the results saved in a database, and that database be referred to weeks or months later for information on a specific webpage located at a search result URL, it is very possible that the information will have changed and the characterization will be partially or totally inaccurate. In many cases the general content and format/composition of a webpage will remain constant over a long period of time and the information contained in a database would be sufficient. The trade-off is in saving time by utilizing a database as opposed to performing real-time webpage analysis to ensure that the analysis is 100% accurate. With regard to the presence of search term elements in a webpage located at a search result URL, the most accurate analysis would be that performed immediately following the generation of the search results in response to a user's request. Regardless of when the analysis of webpages referred to in search results is performed relative to the time of a user's search, the present invention uniquely describes systems and methods for analyzing, characterizing, annotating, and/or filtering the search results.

Thus according to the present invention, an Internet search results webpage is analyzed to determine certain specific characteristics of each webpage located at each search result URL provided in the Internet search results webpage. Once this analysis is performed, in one embodiment of the present invention each search result on the search results webpage is symbolically annotated to convey to the user who performed the Internet search the specific characteristics of the webpage located at the URL corresponding to the search result where these specific characteristics have been determined by the analysis. Alternately or in combination with this annotation functionality, certain search results may be filtered or deleted from the search results webpage such that the user never sees them and is therefore never distracted by them.

The analysis of each webpage located at each search result URL (and each descendant page of such a webpage) provided in the Internet search results webpage may determine certain specific characteristics that fall into different categories. Two exemplary and non-limiting categories are:

1) The composition of the webpage with regard to the types and mix of content that is provided on the webpage, included but not limited to content, composition, style, organization, purpose, and behavior of the webpage; and 2) The presence or lack of presence of the search term elements that were provided by the user in making the search request that resulted in the search results. Related to this form of characteristic, further analysis may optionally determine the presence or lack of presence of search term elements in descendant webpages of a webpage located at a search result URL.

With regard to the composition of a webpage located at a search results URL, the definition of, organization of, and delineation of categories that may be used to categorize any given search results webpage is somewhat arbitrary, and hence the categories shown herein are exemplary and non-limiting. Other categories are possible and are considered to be within the scope of the present invention. Also, while a system or method according to the present invention may start with the categories shown, an additional feature of the invention includes the ability of the system or method to learn the likes of a particular user and adjust the categorization methodology to better align thereafter with the determinations of a specific user. For instance, a user may view a system according to the present invention wherein a first webpage located at a certain search result URL is automatically placed by the system in category "A". The user may then indicate to the system that for their preferences, the particular webpage would be better placed in category "B". Thereafter, other webpages located at search results URLs that are similar to the first webpage would be placed in category B instead of category A.

Example Categories Regarding Webpage Composition

The following examples show both a category description and an abbreviation that represents the category. The choices for these abbreviations are completely arbitrary. Note also that for the characterization of any given webpage these categorizations are not mutually exclusive. A particular webpage may be characterized by any multiples of the categories listed below in any combination.

Figure 3:
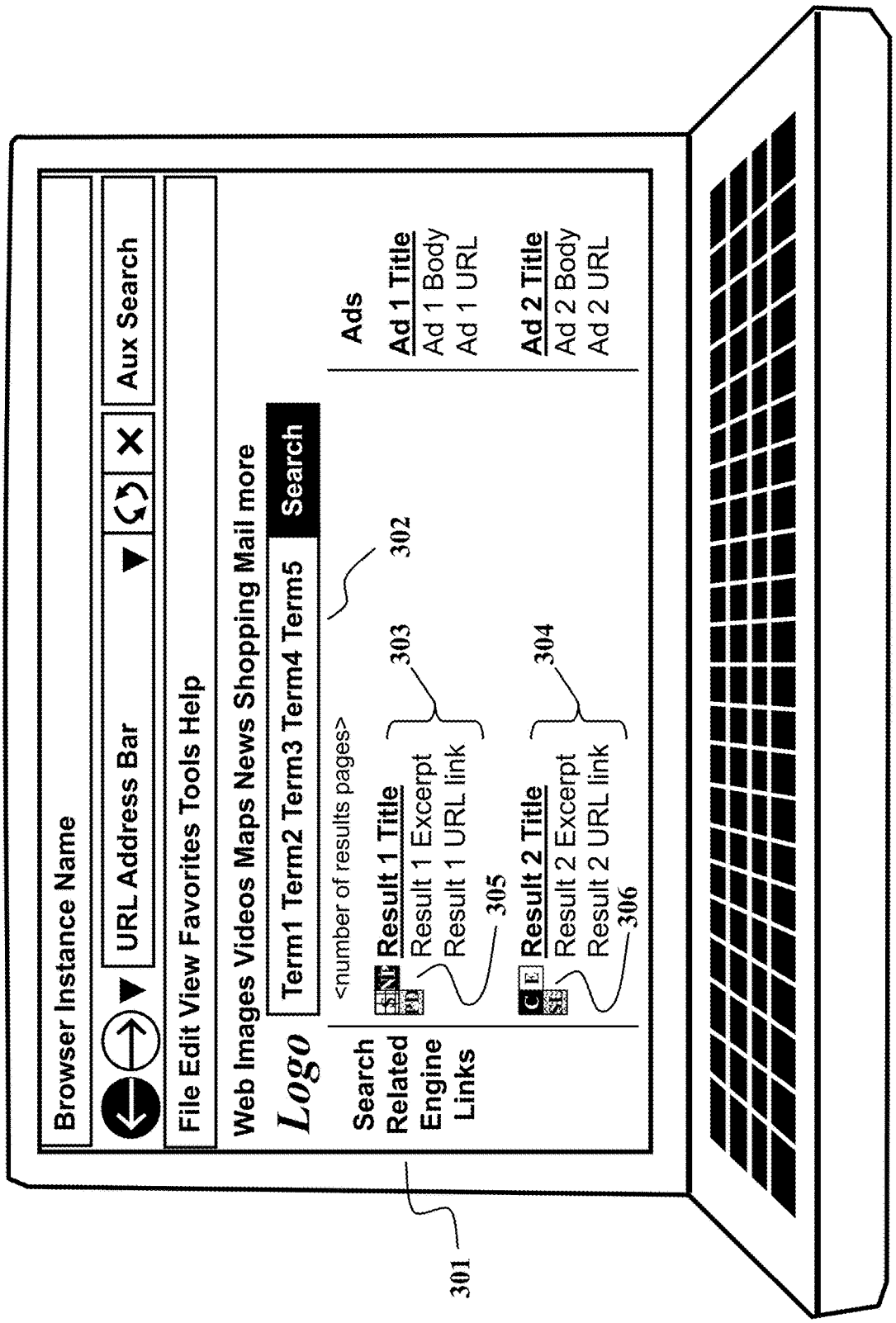
FIG. 3 shows an annotated search engine results webpage according to the present invention where annotations have been added adjacent to search result groupings indicating categorization of the webpage located at each search result URL link.

Webpages that are focused on a search or search/compare capability
- C—Price Comparison Website
  - e.g. Nextag.com
- S—Search site—takes the search criteria from the initial search and inserts all or part of that criteria into a search line, runs a search, and displays results. Alternately, the webpage inserts all or part of the search criteria into a search line, and asks the user if the displayed search criteria was what they were looking for. This last scenario may overlap with "Echo" websites that parrot-back the user's search terms but show little or no relevant information.
  - e.g. theFind.com Webpages that primarily comprise links to other websites:
- L—Site is predominately links—Site may look to be focused on a product or service category, but most user actions are greeted with a list of links or sponsored links.
  - e.g. masterphone.com
- SL—Site includes some sponsored links such as Google Adwords or equivalent Webpages that comprise an offer of information on one or more topics:
- I—Site offers information but is not selling the information—May also include sponsored links or banner ads/videos.
  - e.g. Wikipedia.org and "Wiki" sites in general
- V—Review site—focuses on product reviews.
  - e.g. PlasmaTVBuyingGuide.com
- Bl—Blog site
  - e.g. blogger.com
- Fo—forum site, discussion site—theme focused
  - e.g. bimmerforums.com
- N—News site
  - e.g. CNN.com
- SN—Social Networking site
  - e.g. Facebook.com Webpages that comprise information related to goods and/or services for sale or distribution:
- R—Retailer/Distributor Site
  - e.g. Amazon.com
- G—Gallery site for Art/Photos/Images/Stock Photos/Clip-Art, etc.
  - e.g. iStockPhoto.com
- V—Video site
  - e.g. CBMovies.com
- PD—Publication/Document site—docs are available free, or free by registration, or for sale. Abstracts may be shown. Site may show part or all of an abstract and may not show all search term elements. All search term elements may appear on the complete document but which must be purchased or retrieved after registration. Typical examples of these are businesses that sell copies of scientific papers or Market Research firms that sell reports/forecasts.
  - e.g. ScienceDirect.com Webpages that comprise information related to the behavior of the webpage:
- E—"Echo" or "Parrot" website—whatever search terms the user types in, the site somehow manages to have the search phrase appear on the page, although the search phrase does not appear anywhere on the page in the normal context of the page.
  - e.g. theFind.com Webpages that reside on the website of a company that is the primary manufacturer of goods or provider of services where the domain URL of the webpage is the primary URL (Home page) of the company:
- H—Manufacturing or Service company home page (primary corporate) site Contains submenus like "Home", "About", and "Contact" Offers detailed product/service information
  - e.g. IBM.com Webpages that comprise content that is in some way related to the domain name of the webpage:
- U—URL or Domain site—similar to Corporate site, however is located at a domain URL that is contained in the search terms and/or is closely related to the search terms.
  - e.g. 1800flowers.com FIG. 3 shows search engine results in a browser window 301 which have been annotated according to the present invention. Five search term elements are shown in the search input bar 302. Two example search result groups 303 and 304 are shown. Adjacent search result group at 303 are annotated abbreviations 305 which for example would classify the webpage located at the URL associated with search result group 303 as a (S) search site offering (PD) publications/documents for sale, and where (NP)—some but not all the search term elements appear on the page, termed herein a Null Partial webpage. Adjacent search results group 304 are annotated abbreviations 306 which for example would classify the webpage located at the URL associated with search result group 304 as (C) a price Comparison website, (SL) indicating the webpage contains sponsored links, and (E) indicating that the webpage is characteristic of an "Echo" or "Parrot" website where the search terms the user typed in manage to appear as the search phrase on the page, however the search terms appear nowhere else on the page. To enhance the abbreviations, a combination of letters and colors may be used together, or alternately, only letters with no color enhancement or colors with no letters. In the figures, different background patterns are used behind abbreviation letters to indicate where different colors might be used in an actual implementation. Alternately, there may be only colors, with no letter abbreviations, to designate the various webpage composition classifications.

Figure 4:
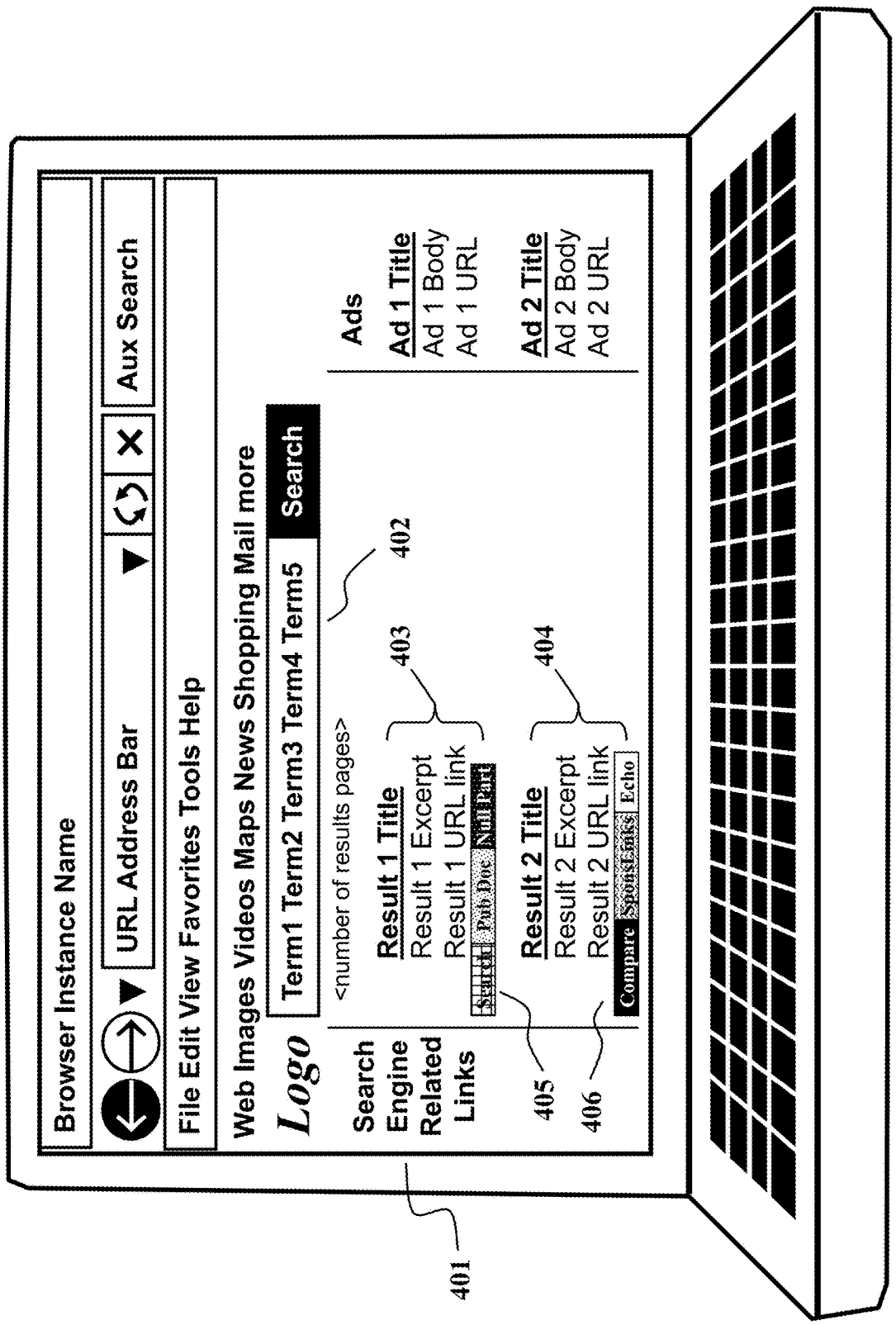
FIG. 4 shows an alternative form of annotation for a search engine results webpage according to the present invention wherein categories are spelled out in longer format rather than the short form abbreviations shown in FIG. 3.

FIG. 4 shows a browser window 401 with annotated search results according to the present invention. Search input bar 402 again shows five search term elements similar to input bar 302 in FIG. 3. Result groupings 403 and 404 show an alternate form of annotation style 405 and 406. Instead of a small box with one or two letter abbreviations as shown for annotations 305 and 306, FIG. 4 shows categorization annotations with their names spelled out or with longer abbreviations than those in FIG. 3. For instance annotation 405 in FIG. 4 still indicates that the webpage located at the URL for search result 1 is a search page offering publications/documents for sale and where some but not all the search term elements appear on the page, termed herein a Null Partial webpage. The annotation style of FIG. 4 will utilize more screen area in the vertical direction than that of FIG. 3, however it may be easier for some users to understand and adapt to. As in FIG. 3, the shading patterns used are intended to indicate where colors would also differentiate the annotation categories. The choice of a short abbreviation format or the longer form shown in FIG. 4 could be a configuration option offered to the user. If the same colors are used for categories in both the formats of FIG. 3 and FIG. 4, a user could start with the long form annotation of FIG. 4 and once they begin to associate the colors with the categories, they can switch to the short form abbreviation of FIG. 3 which is more space efficient on the screen.

Example Categories Regarding the Presence of Search Term Elements

Although a search engine may reference a webpage as one that should show all the search term elements previously specified by the user performing the search, that is frequently not the case. The logical operation performed by a search engine when multiple search term elements are specified by a user is assumed by default to be the "AND" function. As such, if the user specifies three separate words as search term elements, those three words should appear in every webpage represented by a URL in the search term results. Many times some but not all of the search term elements will appear in a webpage located at a URL provided by the search results. Sometimes none of the search term elements appear on such a webpage.

In analyzing a webpage located at a search result URL, the functionality according to the present invention performs a general characterization with regard to the presence of search term elements and indicates, as an annotation, an abbreviation indicating to the user the degree to which their specified search terms appear in the webpage located at the search result URL. These general characterizations may also be used as filtering criteria per FIGS. 10 and 11. Further, abbreviations may be supplied to indicate the presence of search term elements in descendant pages of a webpage located at a search result URL. The presence of search term elements in a descendent webpage can be especially useful to a user when less than all the specified search term elements appear in a webpage whose URL appears in the search term results. The following are examples of general characterizations which relate to the presence of search term elements. These are by no means all the characterizations which are possible with regard to this webpage characteristic. These characterizations are exemplary and non-limiting, and other characterizations are possible.

N—Null page—None of the search term elements appear on the page.

NP—Null Partial—Some but not all the search term elements appear on the page.

ND—Null Descendant—Not all the search term elements appear on the page and some of the missing search term elements appear on descendant pages of the page.

DC—Descendant Completes—At least one descendant page contains some or all of the search term elements, such that the result page together with its descendant pages contain all the search term elements.

Alternately, a scheme of abbreviations can be utilized where the presence of search term elements in the page located at a search result URL is annotated separately from an annotation indicating the presence of search term elements in descendant webpages.

Figure 5:
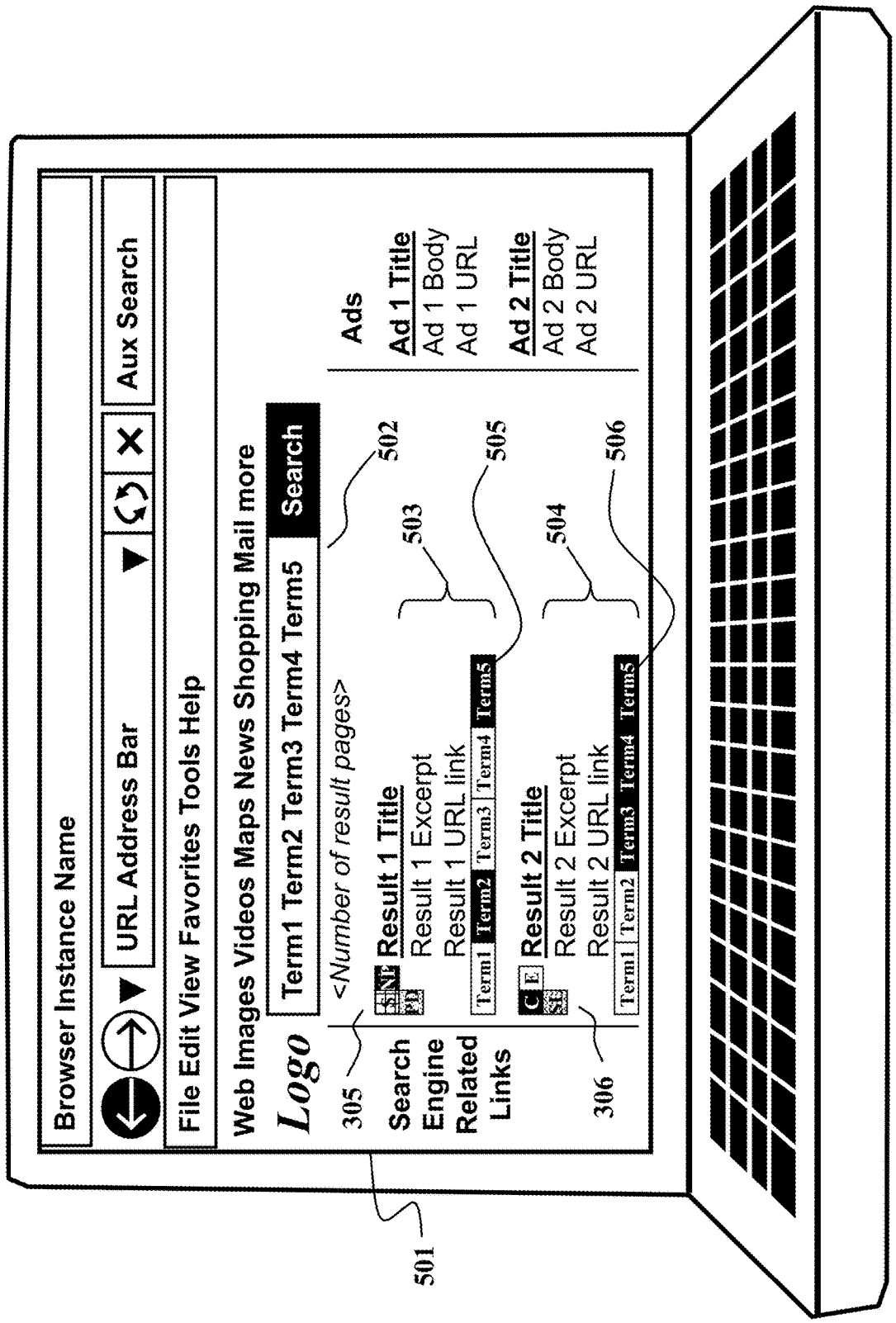
FIG. 5 shows an annotated search engine results webpage according to the present invention with abbreviated categorization similar to FIG. 3 but also including separate annotations adjacent each search result grouping to indicate which search term elements are present in the webpage referenced by the search result URL link.

According to the invention, certain specific characteristics of the webpage located at the URL corresponding to the search result may comprise which search term elements are present in the webpage located at the URL corresponding to a search result out of those search term elements that were submitted to a search engine to produce the search results webpage. FIG. 5 shows one exemplary embodiment indicating how this information conveying the specific presence of search term elements may be annotated on a search results webpage 501. Search input bar 502 contains five exemplary search term elements. Search result groupings 503 and 504 optionally contain category annotations 305 and 306 similar to those shown in FIG. 3. In addition, search result groupings 503 and 504 contain search term elements annotations 505 and 506 indicating for example which search term elements actually appear on the webpage located at the search result URL link. In this example search term elements which are present might be shown as black text on a white background, with those search term elements that are not present shown with white text on a black background. Colors and shadings here are arbitrary and exemplary.

In addition to the search term element related annotations shown in FIG. 5 and the analysis that determined the presence of search term elements, the specific characteristics of the webpage located at the URL corresponding to the search result may further comprise which search term elements are present in a descendent webpage of the webpage located at the URL corresponding to the search result out of those search term elements that were submitted to a search engine to produce the search results webpage.

Figure 6:
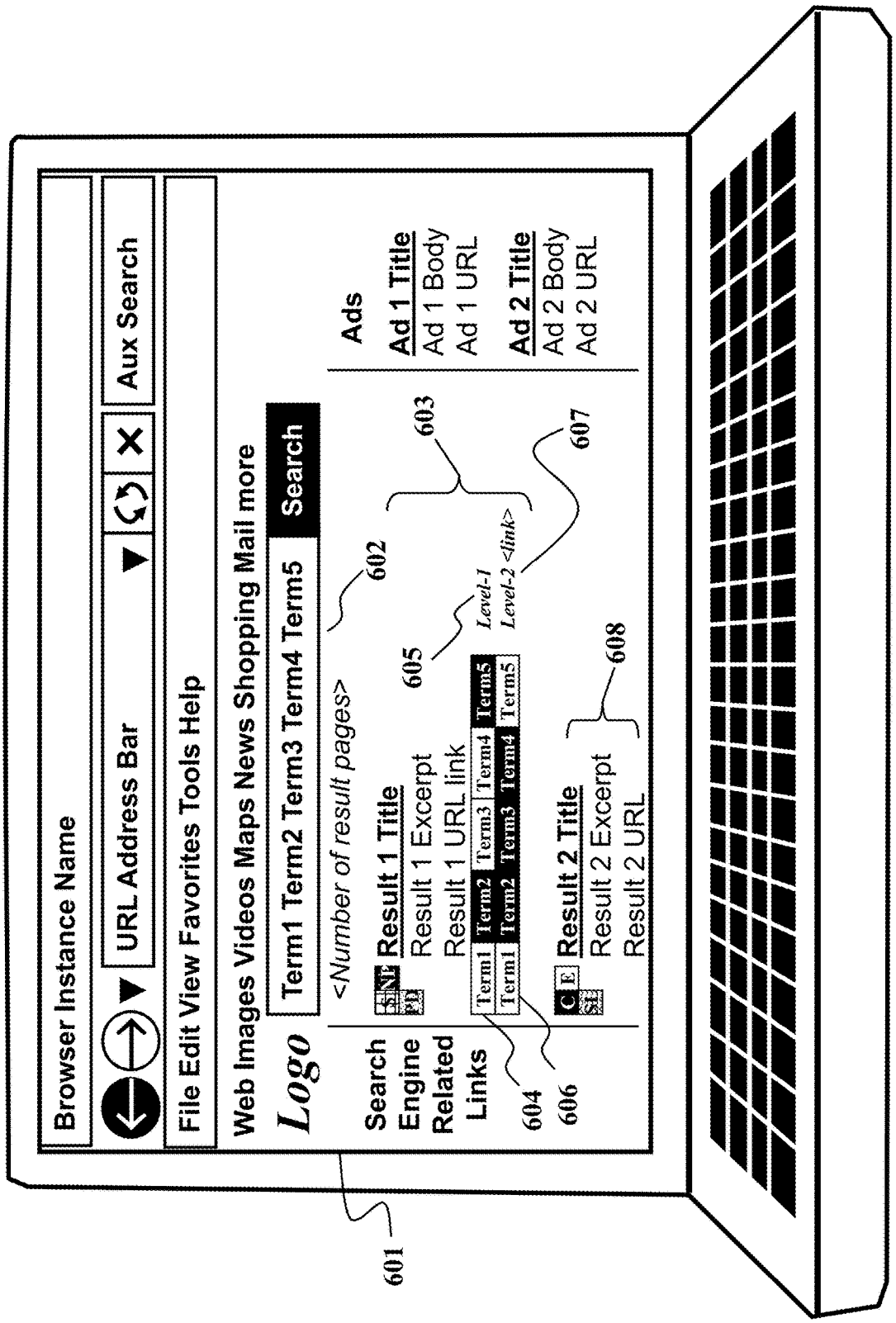
FIG. 6 shows an annotated search engine results webpage according to the present invention with abbreviated categorization annotations shown as well as separate annotations adjacent each search result grouping to indicate which search term elements are present in the webpage referenced by the search result URL link, also including which search term elements are present in a descendant webpage of the webpage referenced by the search result URL link.

In order to further convey the presence of search term elements in descendent webpages, FIG. 6 shows an annotated search results browser window 601 showing search input bar 602 again with five example search term elements. Search result grouping 603 now contains two rows 604 and 606 of annotation information related to the presence of search term elements. Row 604 contains an annotation of search term elements present in the webpage located at the URL link for search result 1. Level-1 identifier 605 appears adjacent row 604. Additionally a row of search term element annotation 606 is presented which refers to Level-2 webpage 607 which is a descendent of the webpage located at the primary URL link herein referred to as Level-1 605. The next search result grouping 608 is shown below grouping 603 and has been moved further down the page as a result of the vertical screen area required for search term element annotations 604 and 606. As such, annotations related to the presence of search term elements in the webpage located at the URL for search result 2 are not shown in the image of FIG. 6.

Figure 7:
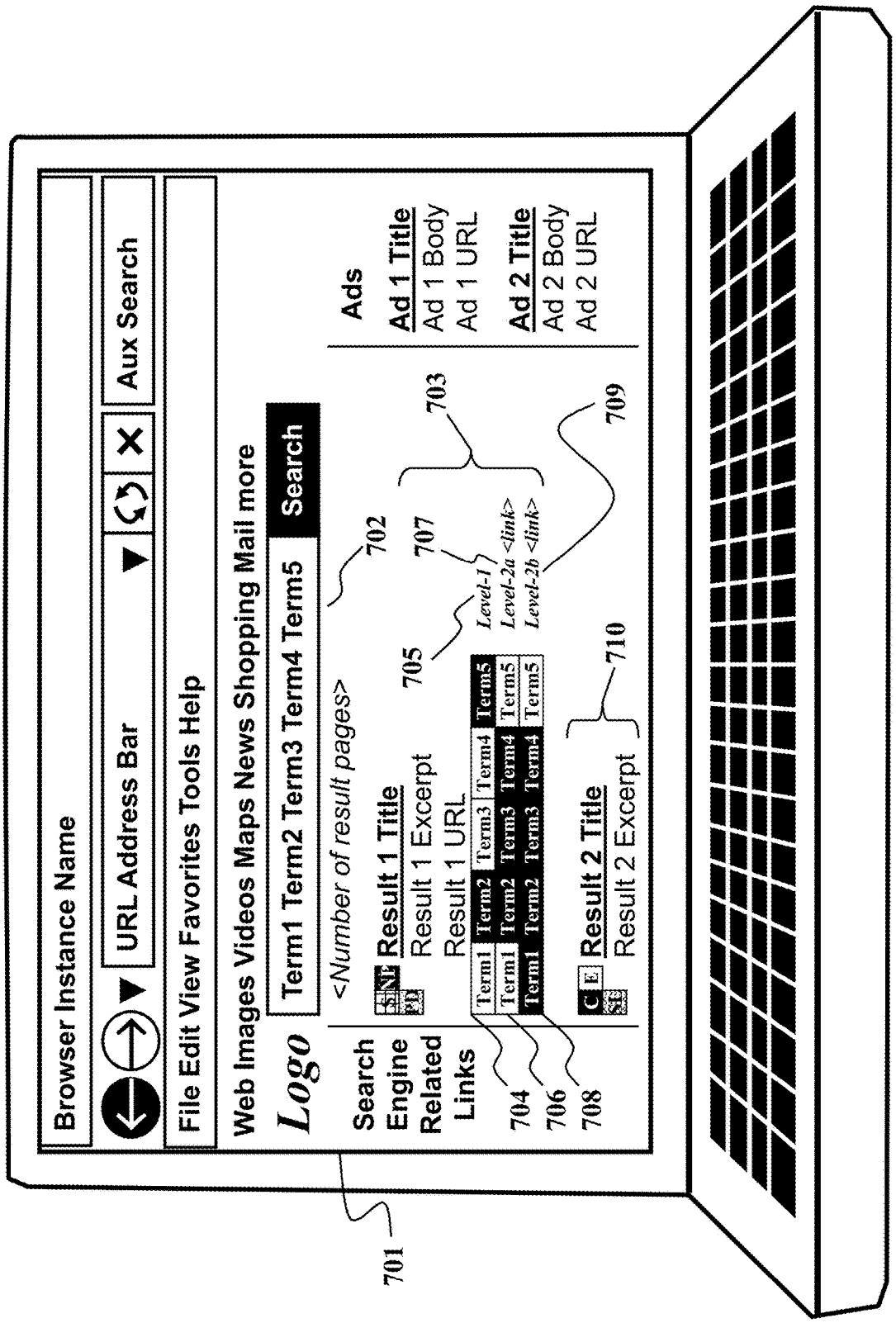
FIG. 7 shows an annotated search engine results webpage according to the present invention with abbreviated categorization annotations shown as well as separate annotations adjacent each search result grouping to indicate which search term elements are present in the webpage referenced by the search result URL link, also including which search term elements are present in multiple descendant webpages of the webpage referenced by the search result URL link.

Frequently webpages residing at the search result URLs contain multiple links to descendent webpages wherein these descendent webpages may contain some or all of the search term elements. FIG. 7 shows an annotated search result browser window 701 with search input bar 702 showing again five specific search term elements. Search result grouping 703 has been further annotated in the example of FIG. 7 to show the presence of search term elements in more than one descendent webpage. As such, the search term elements 704 present at Level-1 705 indicate search term elements are present or not present in the webpage located at the result 1 URL. Additionally, rows 706 and 708 provide annotation for search term elements present or not present in the webpage located at the result 1 URL, while level annotations 707 and 709 provide detailed regarding two example descendent pages of the page located at the result 1 URL. Annotation 705 indicates that the first listing of search term elements in row 704 correspond to Level-1, the webpage located at result 1 URL. Search result grouping 710 corresponds to search result 2, and only the upper portion of this grouping is shown in FIG. 7 as the additional annotation for search result grouping 703 has consumed additional screen area in the vertical direction. Note that in reality more search results would be shown on a typical PC monitor and that the text in FIG. 7 and preceding figures has been magnified for clarity.

Some categories of webpage such as those selling documents/publications frequently show up in search results even though only some of the search term elements appear in the webpage. A frequent scenario includes showing only an abstract or part of an abstract on the page that is referenced in the search results while the remainder of the search terms appear in a descendant page which is the full document that requires payment or registration. Unfortunately, the user is not able to see the full document before paying or registering which creates a "catch-22" situation. A user wishing to not visit those webpages can be forewarned by annotation and/or filtering according to the present invention.

According to the present invention, Internet search results are analyzing and annotated and/or filtered. Webpages located at search results URLs are analyzed to determine certain specific characteristics of each webpage located at a search result URL provided in the Internet search results webpage. Subsequently, each search result grouping on the search results webpage is symbolically annotated to provide the search user with additional information to convey specific characteristics of the webpage located at the URL corresponding to the search result. While it is possible for the search engine provider themselves to analyze webpages in advance and record such characteristics, such activity may be counter to their business model and also provides information that will occasionally not be current or accurate. The preferred embodiment for the present invention is to perform a new analysis of a webpage immediately after a search is performed that references the webpage in the search results. It is also possible for a user to record information about a webpage as they encounter that webpage, and utilize that information for annotation or filtering in future searches. Again this is not the preferred embodiment according to the present invention as such information would again no longer be current and therefore not necessarily accurate. Computing bandwidth at the time of the invention has increased enormously over that available in previous years, both on individual personal computing devices as well as servers present on the Internet and now in the Cloud. As such, performing webpage analysis in real time is no longer as time-consuming as would have been the case previously.

Process 800 for one embodiment of the present invention is described in FIG. 8*a*. Here a user performs 801 a normal web search. Subsequently a software program with access to the Internet automatically visits 802 each search result URL and analyzes the webpage located at a URL to categorize the webpage in accordance with criteria described herein thereby determining certain specific characteristics of the webpage. These characteristics may relate to the composition, style, function, or behavior of the webpage and may also relate as described in FIG. 8*b* to the presence of search term elements on a webpage. As the analysis is been completed for each webpage located at a search result URL, the search results webpage is annotated 803 with indicators displayed adjacent to each search result grouping to indicate the categorization of the webpage located at the URL displayed within the grouping.

According to the process 810 of FIG. 8*b*, a user performs 811 a normal web search, followed by a software program according to the invention automatically visiting each search results URL whereby the webpage at each URL is analyzed 812 to determine what search term elements if any, are present in the webpage. In step 813, the search results webpage is automatically annotated such that each search result (individual URL) on the search results webpage is provided with information adjacent to each search result grouping to indicate which search term elements are actually present in the webpage, and which are not present.

Figure 9:
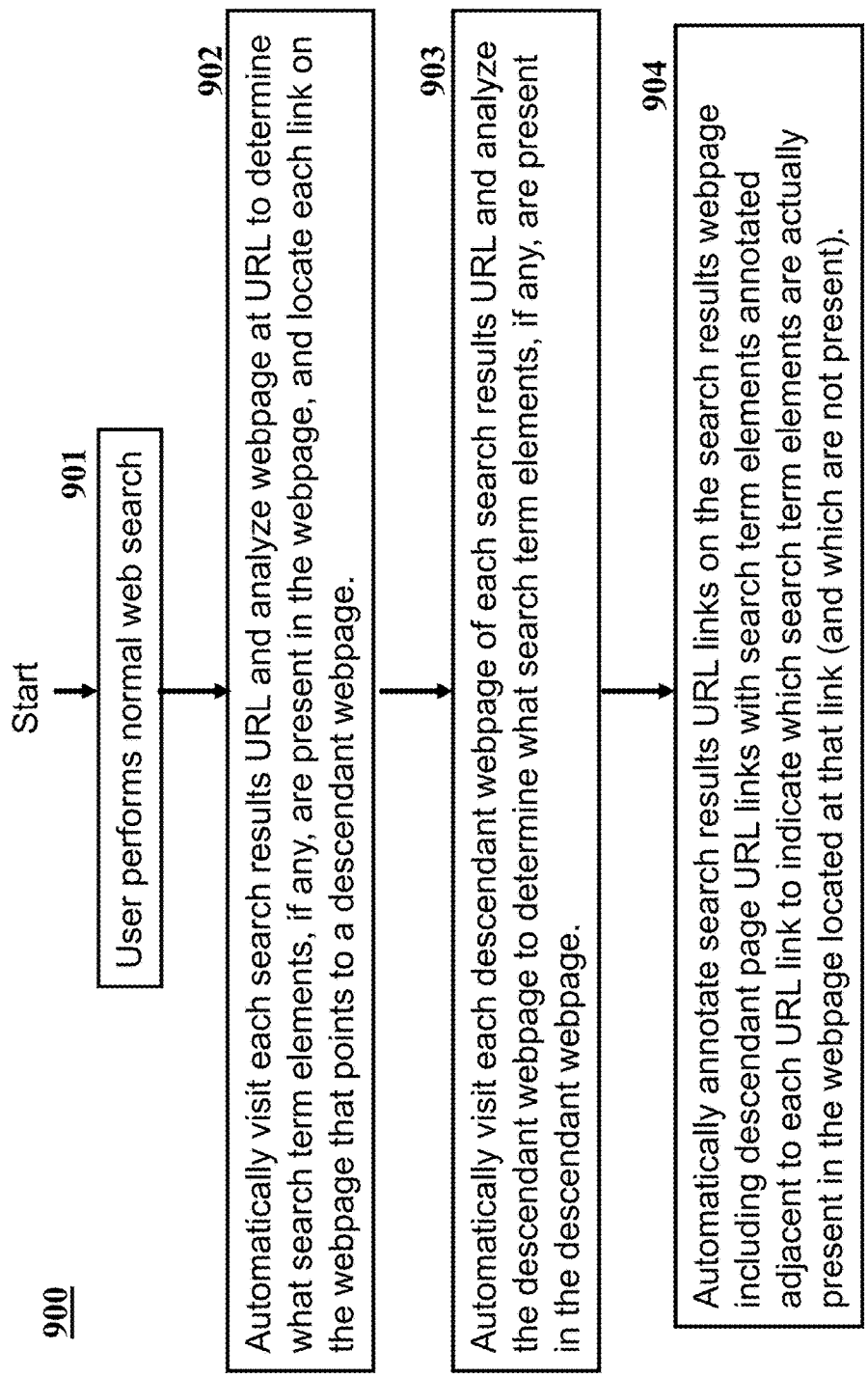
FIG. 9 shows the process of analysis and annotation to indicate which search term elements are actually present in a webpage located at a search result URL link, as well as which search term elements are present in descendent webpages of a webpage located at a search result URL link.

It is common that, especially when a complex combination of search terms is entered into the search bar in a search engine webpage, that some search term results provide links to webpages that do not contain all of the specified search term elements. In some cases those webpages contain links to descendent webpages which in fact may contain some or all of the missing search term elements, and/or all of the specified search term elements. To indicate to the user which pages and descendent pages referenced by the provided search results contain the search term elements they seek, it is useful to analyze webpages located at search results URLs and their descendent webpages to determine this information. According to process 900 of FIG. 9 a user performs 901 a normal web search. Subsequently, a software program with Internet access automatically visits each search results URL and analyzes 902 the webpage at the URL to determine which search term elements, if any, are present in the webpage and locate each link on the webpage that points to a descendent webpage. Then, a software program with Internet access will automatically visit each descendent webpage uncovered in the analysis of step 902 to determine which specified search term elements, if any, are present in the descendent webpage. Finally in step 904, search result groupings each containing a Level-1 URL link are automatically annotated to additionally include descendent page URL links to indicate which search term elements are present in each descendent webpage and which are not present.

Some users will prefer to view annotations of their search results and not have any information automatically removed. Other users may prefer to have unwanted categories of webpages removed automatically so they have less information to view. Users choosing to delete unwanted information by way of a filtering process may still wish to see the remaining search results annotated according to the present invention. There is an analogy regarding these preferences when one looks at how users typically handle spam email. Many users frequently prefer to have their spam filter mark emails as potential spam and even sort those emails into a separate spam mailbox, at the same time choosing to not delete emails that are determined to be potential spam.

One embodiment of the present invention focuses on annotating a search results webpage without deleting any individual result. According to an alternate embodiment of the present invention, some categories of webpages at search results URLs may have their references removed from a search result webpage according to exemplary automatic filtering procedure 1000. According to FIG. 10, a user first performs 1001 a normal web search. A software program then visits each search results URL, and optionally descendent webpages of each search results URL webpage, and analyzes 1002 each webpage to categorize the webpage for composition type and to determine which search term elements if any are present in the webpage. Subsequently in step 1003, certain search result URLs and related search result groupings, including descriptions and excerpts, are automatically removed according to a predetermined filter selection criteria. In combination with this removal of information, the remaining search results on the search results page may be optionally annotated 1004 according to the present invention displaying indicators adjacent to each URL link indicating categorization of each webpage and optionally which search term elements are actually present in the webpage (or its descendent pages), and which search term elements are not present.

Figure 10:
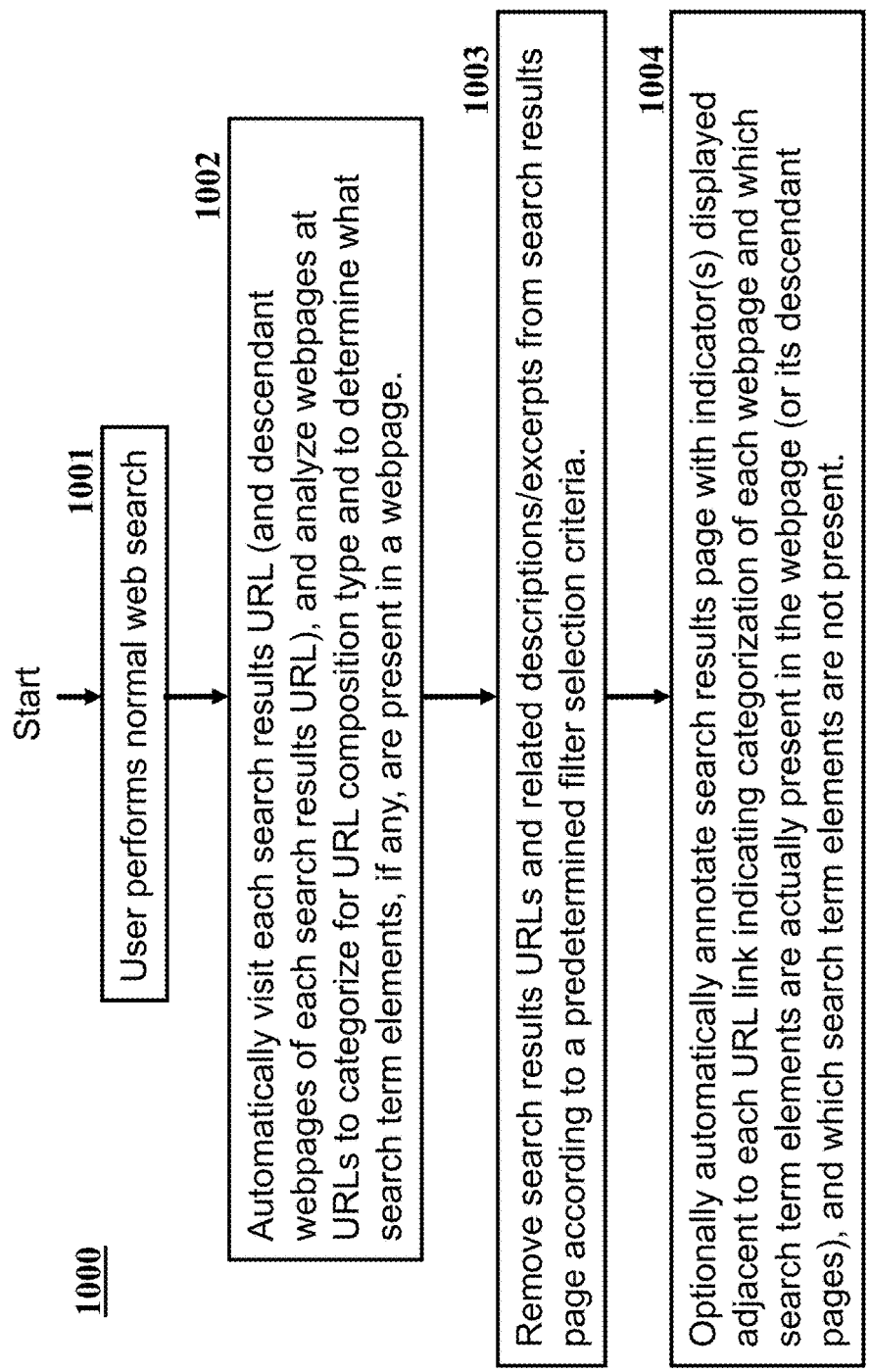
FIG. 10 shows the process for analyzing webpages to categorize them for composition type and presence of search term elements, followed by filtering search results to remove certain search result groupings according to a predetermined filter selection criteria.

When the filtering operation per the procedure of FIG. 10 is employed, a search results page may end up with fewer result groupings than the initial 10 groupings which is common to current search engines. In this case, fewer results may be shown on each results webpage, or alternately an additional search may be performed to add search results to bring the total back to the standard 10 groupings. If annotation is utilized in conjunction with the filtering process, while filtering deletes information, annotation will normally add information. The resulting combination may produce a similar overall amount of information to what is normally shown on a search results webpage. When a filtering function is desired as described herein, annotation engine 211 and analysis/annotation engine 208 of FIG. 2 would also perform the filtering function and alter the search results webpage accordingly.

When a user wishes to employ search results filtering, it is useful to include a filtering criteria table such as that shown in FIG. 11. The diagram of FIG. 11 is organized in the manner that a dialog box 1101 might be constructed to appear on a user's screen as part of a configuration function associated with the present invention. Here, a column 1102 is included to indicate whether a characteristic should be selected or not for the filtering operation. Here radio buttons such as 1103 provide a "check box" indication of which characteristics a user wishes to include in the filtering process and which they do not. As shown here, a box being checked would for example indicate that webpages located at a search results URL would be viewed by the user when their characteristic is checked in column 1102, and that when not checked, webpages at search results URLs with unchecked characteristics would be filtered-out or removed from their search results webpage display. Alternately, an implementation can be constructed where the reverse is true relative to which boxes are checked and which are not. The next column 1104 indicates for instance an abbreviation for the filter characteristics such as the characteristic abbreviated G 1105 indicating for example a Gallery style webpage 1006. For consistency and ease of use, it is best if the abbreviations shown in column 1104 of FIG. 11 are consistent with abbreviations adjacent search result groupings shown in FIG. 3 and FIGS. 5 through 7. Column 1107 indicates a more detailed description of each webpage characteristic type. In this example characteristic ND is checked indicating 1108 that webpages will be allowed where missing search term elements appear on Descendent pages. Characteristic DC is also checked indicating that including Descendent pages, all search term elements appear 1109. Characteristic S is checked indicating that Search type webpages are included 1110 in the displayed search results. Characteristic I is checked indicating that Information webpages are included 1111 in the displayed search results. Characteristic Fo is checked indicating that theme-focused Forum-type webpages are included 1112 in the displayed search results. Characteristic SN is checked indicating that social networking webpages are included 1113 in the displayed search results.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts, while remaining within the scope of the appended claims. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system for providing annotated Internet search results suitable for display to a user of a computing device connected to an Internet, wherein the system comprises:
   one or more servers comprising one or more processors, wherein at least one of the one or more servers is connected to the Internet; and
   wherein the system receives a search request provided from the user of the computing device, the search request comprising one or more search term elements;
   wherein in response to the user's provision of the search request the system causes an Internet search to be performed based at least in part on the search request;
   wherein the system transmits to the computing device, via the Internet, information comprising at least one automatically annotated Internet search result, and wherein the transmitted information is suitable for display on a search results webpage on the computing device;
   wherein the automatically annotated Internet search result is provided for display on the search results webpage as a search result grouping referencing a webpage associated with the automatically annotated Internet search result;
   wherein the search result grouping comprises an annotation and at least one of: a title, an Internet link, an excerpt, or a URL;
   wherein the annotation is provided in response to a presence or absence of the one or more search term elements in the referenced webpage;
   wherein the annotation is automatically placed in the search result grouping so that it is associated with the automatically annotated Internet search result; and
   wherein the annotation comprises one or more search term elements missing in the referenced webpage and provides an indication that the automatically annotated Internet search result is less relevant with regard to what the user seeks.

2. The system of claim 1, wherein the annotation is provided also in response to a presence or absence of the one or more search term elements in one or more descendant webpages of the referenced webpage, and wherein each descendant of the referenced webpage is a webpage linked directly one level from the referenced webpage.

3. The system of claim 2, wherein the system further provides a selectable filtering function that, when selected by the user, causes one or more Internet search results referencing webpages that are missing one or more search term elements to be removed from being displayed on the search results webpage on the computing device.

4. The system of claim 2, wherein the automatically annotated Internet search result is placed on the search results webpage with one or more advertisements related to one or more of the search term elements.

5. The system of claim 2, wherein the annotation comprises text representing at least one search term element in at least one of the following formats:
   (i) a font representing the text has been altered; or
   (ii) the text is shown with one or more lines merged with the text; or
   (iii) the text is shown with one or more lines superimposed thereupon; or
   (iv) the text is shown within a shaded area; or
   (v) the text is shown with a reversed format.

6. The system of claim 1, wherein the system further provides a selectable filtering function that, when selected by the user, causes one or more Internet search results referencing webpages that are missing one or more search term elements to be removed from being displayed on the search results webpage on the computing device.

7. The system of claim 1, wherein the automatically annotated Internet search result is placed on the search results webpage with one or more advertisements related to one or more of the search term elements.

8. The system of claim 1, wherein the annotation comprises text representing at least one search term element in at least one of the following formats:
   (i) a font representing the text has been altered; or
   (ii) the text is shown with one or more lines merged with the text; or
   (iii) the text is shown with one or more lines superimposed thereupon; or
   (iv) the text is shown within a shaded area; or
   (v) the text is shown with a reversed format.

9. The system of claim 1, wherein the system also includes the computing device.

10. The system of claim 1 wherein the annotation enables the user to reduce lost time, thereby speeding an Internet search process.

11. A method for providing annotated Internet search results suitable for display to a user on a computing device, wherein the method comprises:
   receiving a search request provided by the user from the computing device, the search request comprising one or more search term elements;
   causing an Internet search to be performed based at least in part on the search request in response to the user's provision of the search request;
   transmitting to the computing device, via an Internet, information comprising at least one automatically annotated Internet search result;
   wherein the transmitted information is suitable for display on a search results webpage on the computing device;
   wherein the automatically annotated Internet search result is provided for display on the search results webpage as a search result grouping referencing a webpage associated with the automatically annotated Internet search result;
      wherein the search result grouping comprises an annotation and at least one of: a title, an Internet link, an excerpt, or a URL;
      wherein the annotation is provided in response to a presence or absence of the one or more search term elements in the referenced webpage;
      wherein the annotation is automatically placed in the search result grouping so that it is associated with the automatically annotated Internet search result; and
      wherein the annotation comprises one or more search term elements missing in the referenced webpage and provides an indication that the automatically annotated Internet search result is less relevant with regard to what the user seeks.

12. The method of claim 11, wherein the annotation is provided also in response to a presence or absence of the one or more search term elements in one or more descendant webpages of the referenced webpage, and wherein each descendant of the referenced webpage is a webpage linked directly one level from the referenced webpage.

13. The method of claim 12, wherein the system further provides a selectable filtering function that, when selected by the user, causes one or more Internet search results referencing webpages that are missing one or more search term elements to be removed from being displayed on the search results webpage on the computing device.

14. The method of claim 12 wherein the automatically annotated Internet search result is placed on the search results webpage with one or more advertisements related to one or more of the search term elements.

15. The method of claim 12 wherein the annotation comprises text representing at least one search term element in at least one of the following formats:
   (i) a font representing the text has been altered; or
   (ii) the text is shown with one or more lines merged with the text; or
   (iii) the text is shown with one or more lines superimposed thereupon; or
   (iv) the text is shown within a shaded area; or
   (v) the text is shown with a reversed format.

16. The method of claim 11, wherein the system further provides a selectable filtering function that, when selected by the user, causes one or more Internet search results referencing webpages that are missing one or more search term elements to be removed from being displayed on the search results webpage on the computing device.

17. The method of claim 11 wherein the automatically annotated Internet search result is placed on the search results webpage with one or more advertisements related to one or more of the search term elements.

18. The method of claim 11 wherein the annotation comprises text representing at least one search term element in at least one of the following formats:
   (i) a font representing the text has been altered; or
   (ii) the text is shown with one or more lines merged with the text; or
   (iii) the text is shown with one or more lines superimposed thereupon; or
   (iv) the text is shown within a shaded area; or
   (v) the text is shown with a reversed format.

19. The method of claim 11 wherein the annotation enables the user to reduce lost time, thereby speeding an Internet search process.

20. A computing device apparatus for initiating an Internet search and for providing annotated Internet search results for display on the computing device, wherein the apparatus comprises:
   a computing device having a connection to an Internet, and enabled for communicating with a user and a remote server, wherein the computing device sends, receives, and displays information related to the Internet search; and
   wherein the computing device receives a search request from the user of the computing device, the search request comprising one or more search term elements;
   wherein the computing device causes an Internet search to be performed based at least in part on the search request;

wherein the computing device receives from the remote server, via the Internet, information comprising at least one automatically annotated Internet search result;

wherein the computing device displays the received information on a search results webpage shown on the computing device;

wherein the automatically annotated Internet search result is provided for display on the search results webpage as a search result grouping referencing a webpage associated with the automatically annotated Internet search result;

wherein the search result grouping comprises an annotation and at least one of: a title, an Internet link, an excerpt, or a URL;

wherein the annotation is provided in response to a presence or absence of the one or more search term elements in the referenced webpage;

wherein the annotation is automatically placed in the search result grouping so that it is associated with the automatically annotated Internet search result; and wherein the annotation comprises one or more search term elements missing in the referenced webpage and provides an indication that the automatically annotated Internet search result is less relevant with regard to what the user seeks.

21. The apparatus of claim 20, wherein the annotation is provided also in response to a presence or absence of the one or more search term elements in one or more descendant webpages of the referenced webpage, and wherein each descendant of the referenced webpage is a webpage linked directly one level from the referenced webpage.

22. The apparatus of claim 20, wherein the system further provides a selectable filtering function that, when selected by the user, causes one or more Internet search results referencing webpages that are missing one or more search term elements to be removed from being displayed on the search results webpage on the computing device.

23. The apparatus of claim 20, wherein the automatically annotated Internet search result is placed on the search results webpage with one or more advertisements related to one or more of the search term elements.

24. The apparatus of claim 20, wherein the annotation comprises text representing at least one search term element in at least one of the following formats:
(i) a font representing the text has been altered; or
(ii) the text is shown with one or more lines merged with the text; or
(iii) the text is shown with one or more lines superimposed thereupon; or
(iv) the text is shown within a shaded area; or
(v) the text is shown with a reversed format.

25. The apparatus of claim 20 wherein the annotation enables the user to reduce lost time, thereby speeding an Internet search process.

* * * * *